United States Patent
Shim et al.

(10) Patent No.: US 6,791,537 B1
(45) Date of Patent: Sep. 14, 2004

(54) DISPLAY OF INK FOR HAND ENTERED CHARACTERS

(75) Inventors: Jae H. Shim, San Jose, CA (US); Alex Berelovich, Pleasanton, CA (US)

(73) Assignee: Mobigence, Inc., San Jose, CA (US)

( * ) Notice: Subject to any disclaimer, the term of this patent is extended or adjusted under 35 U.S.C. 154(b) by 36 days.

(21) Appl. No.: 09/900,247

(22) Filed: Jul. 6, 2001

(51) Int. Cl.[7] .............................................. G09G 5/00
(52) U.S. Cl. ..................... 345/173; 178/18.01
(58) Field of Search ................................ 345/156, 173, 345/179; 382/181, 187, 189, 312; 178/18.01, 18.03, 19.01

(56) References Cited

U.S. PATENT DOCUMENTS

| | | | |
|---|---|---|---|
| 5,276,794 A | * | 1/1994 | Lamb, Jr. .................... 345/173 |
| 5,459,796 A | * | 10/1995 | Boyer ........................ 345/173 |
| 5,500,937 A | * | 3/1996 | Thompson-Rohrlich .... 345/764 |
| 5,596,698 A | * | 1/1997 | Morgan ...................... 345/863 |
| 5,677,710 A | * | 10/1997 | Thompson-Rohrlich .... 345/173 |
| 6,642,458 B2 | * | 11/2003 | Panagrossi, III et al. 178/18.01 |

* cited by examiner

Primary Examiner—Regina Liang
(74) Attorney, Agent, or Firm—John F. Schipper

(57) ABSTRACT

Method and system for simultaneous display of standard text characters and hand entered characters in a designated soft write pad portion of a hand held device display screen. When a hand entered character is entered on the soft write pad, standard text on the soft write pad is displayed in a display pattern (color and/or shading and/or thickness and/or font) that is visually distinguishable from a display pattern used for (temporary) display of the hand entered character. The hand entered character is analyzed and, if recognized, is converted to a standard text character and displayed at a location indicated by a cursor. The display pattern of standard text character and/or hand entered characters can be changed by the user. Display of a hand entered character on the soft write pad terminates after a designated time interval.

22 Claims, 3 Drawing Sheets

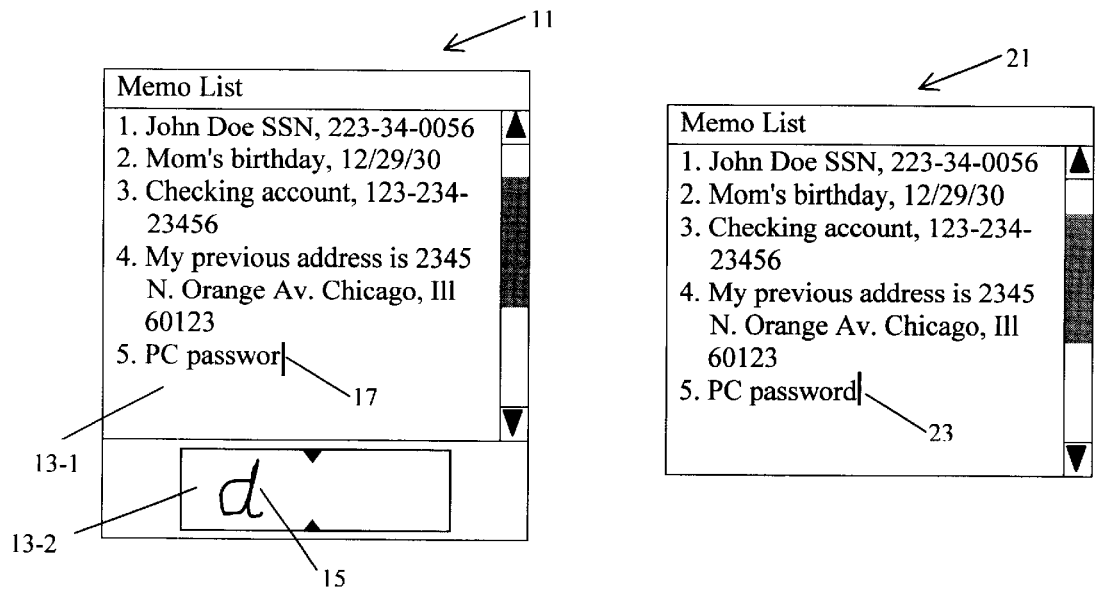
FIG. 1 (Prior Art)
FIG. 2B
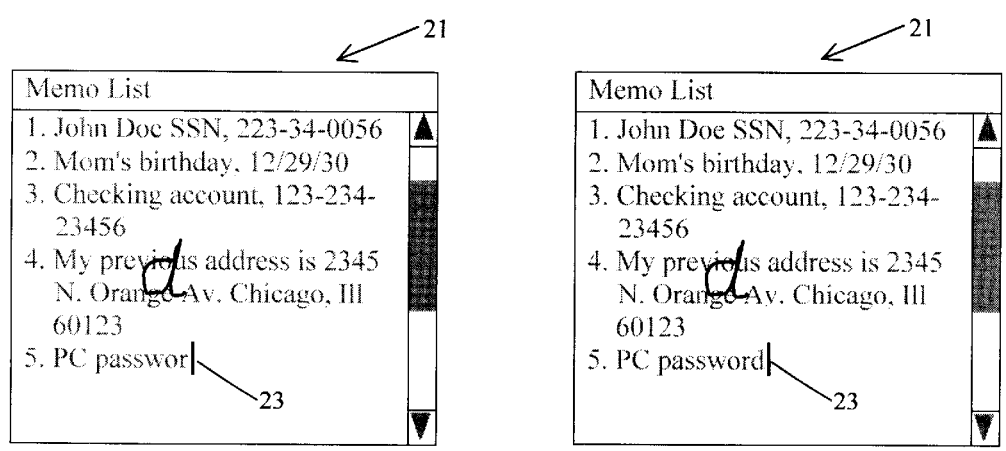
FIG. 2A
FIG. 2C

DISPLAY OF INK FOR HAND ENTERED CHARACTERS

FIELD OF THE INVENTION

This invention relates to electronic display of ink for hand entered characters for a handheld computing device.

BACKGROUND OF THE INVENTION

Conventional hand held computing devices, such as personal digital assistants ("PDAs"), handheld wireless devices and radiotelephone devices referred to as "smart phones" (collectively referred to herein as "hand held devices") provide a touch-sensitive screen ("touch screen") overlaid on a liquid crystal display ("LCD") screen, collectively referred to herein as a display module. Many of the hand held devices provide built-in handwriting recognition or character recognition technology as a user input tool for text editing. This tool is used to recognize handwritten characters entered on a touch screen with a stylus, where each character is displayed on the LCD screen when the character is recognized.

Some of the hand held devices that incorporate handwriting recognition capability display "ink" for a handwritten character on the LCD screen as the character is being written on the touch screen. On such devices, a physically dedicated region ("write pad") within the display module is allocated for user handwriting input and its ink display or viewing, where it is appropriate. Conventional display of ink over standard text makes the ink difficult to distinguish from the standard text, where ink and text have substantially the same font color, usually black for a monochrome LCD. Some devices use thicker ink lines for better display, but this approach is still inadequate to provide a clear distinction between standard text and ink. Use of thicker ink makes it more difficult for a user to identify unacceptable quality in a handwritten character input when character size is small. Lack of distinction between standard text and ink makes it difficult to distinguish between errors arising from user input (e.g., poor handwriting) and errors arising from performance of the handwriting recognition software.

What is needed is an approach that makes the ink more distinguishable from the standard text for a selected time interval after a handwritten/cursive or hand printed ("hand entered") character is entered. Preferably, the relevant characteristics (color, shade, thickness, font, etc., referred to as a "display pattern") of the standard text and/or the ink should be selectable and should be changeable depending upon the user's preference.

SUMMARY OF THE INVENTION

These needs are met by the invention, which in one embodiment changes the display pattern of the standard text, or provides a "grayed out display," as soon as a hand entered alphanumeric character is accepted and ink representing the hand entered character is displayed in a designated region of the screen, referred to herein as a "soft write pad," where standard text characters and handwritten characters (i.e., ink) are both displayed. The soft write pad may be the entire screen or may be a designated sub-region within the entire screen. When the ink is not present, the standard text on the soft write pad is displayed in a conventional display pattern that is presented when no hand entered character is present. When the presence of one or more standard text characters is detected on the soft write pad and ink corresponding to a hand written character begins to be displayed, the conventional display pattern of the standard text and/or the display pattern of the hand entered character ink is changed so that the ink becomes distinguishable. When the ink is removed from the soft write pad, the displayed standard text reverts to the conventional display pattern.

Optionally, where the LCD screen displays two or more colors, the standard text and the ink are displayed on the soft write pad in colors that are distinguishable from each other. Optionally, the standard text color and/or the ink color are user-controlled, to allow compensation for any difficulty a user may have in distinguishing between two or more specified colors (e.g., where a user experiences color blindness). Optionally, the standard text is removed from, or substantially grayed out on, the soft write pad whenever ink is displayed. Optionally, the time during which the ink is displayed on the soft write pad, after removal of stylus pressure, is user-controlled or is automatically set.

BRIEF DESCRIPTION OF THE DRAWINGS

FIG. 1 illustrates a conventional display module, with a standard text display region and an ink display (hard write pad) region physically separated.

FIGS. 2A, 2B and 2C illustrate a display module, configured according to the invention, where a soft write pad region of the screen displays both standard text and ink representing one or more hand entered characters.

DESCRIPTION OF BEST MODES OF THE INVENTION

Figure 3A:
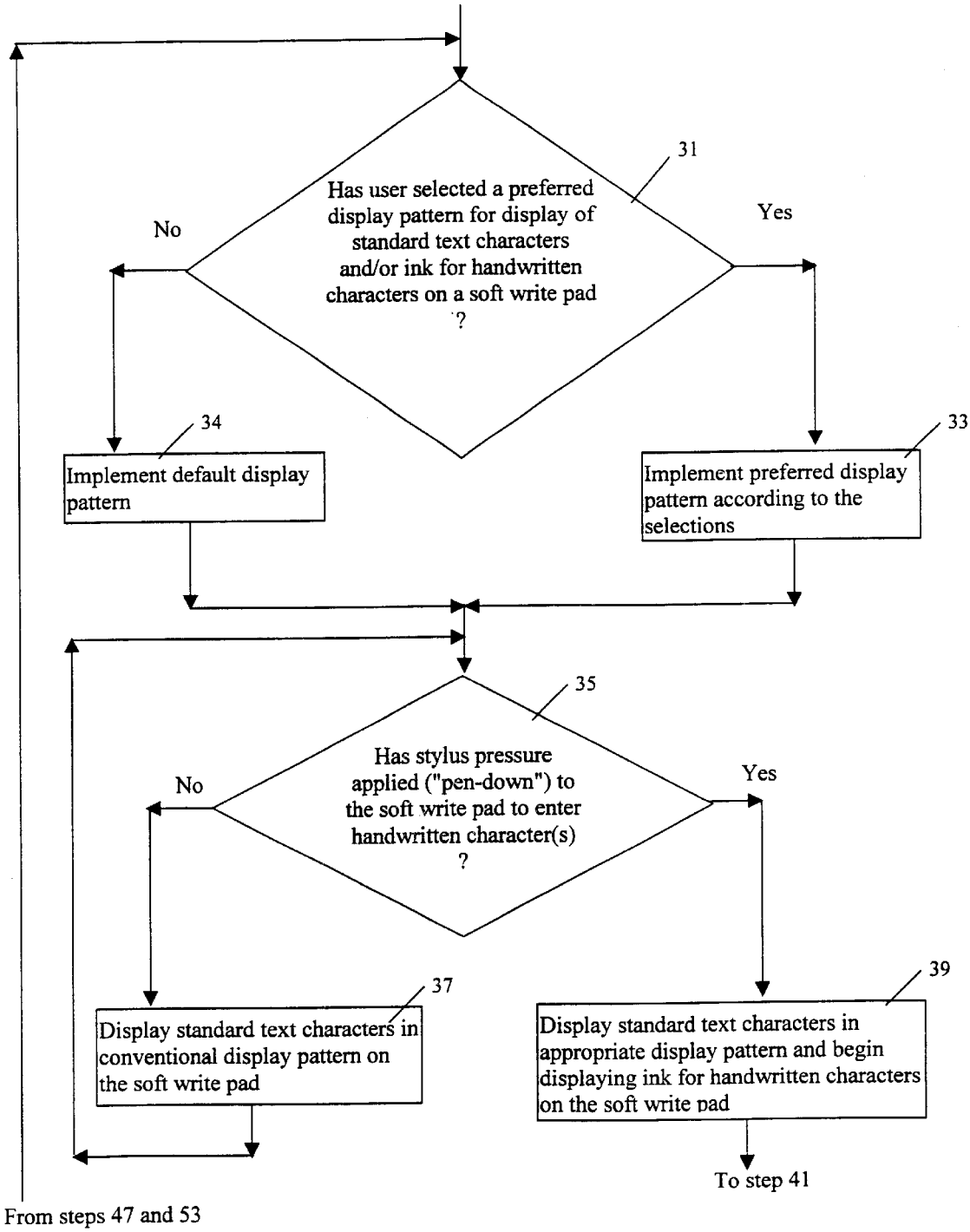
FIGS. 3A and 3B are a flow chart of a procedure for practicing the invention.

FIG. 1 illustrates a display module 11, in which a text region 13-1 is physically separated from a handwriting entry and ink display region 13-2. In the text region 13-1, a cursor 17 is presently located at the end of a not-yet-completed word ("passwor"), and a cursive or hand printed letter "d" (reference numeral 15) has been entered in the handwriting entry (hard write pad) region 13-2. After the character "d" is entered and is recognized, this character would appear as part of the standard text ("PC password") in entry no. 5 in the text region 13-1. This approach allocates a portion of the display module screen 13-2 exclusively to cursive/printed/scripted handwriting, and this portion of the screen is unavailable for use in a standard text editing environment even if the handwriting recognition feature is not presently in use.

FIG. 2A illustrates a display module screen 21 constructed and operated according to an embodiment of the invention, where the handwriting recognition feature is presently being used. A cursor 23 is presently located at the end of the not-yet-completed word ("passwor") in standard text that appears in an appropriate (default or preferred) display pattern, or is grayed out, on the screen. A letter "d" is entered by the user as a cursive or hand printed or scripted alphanumeric character on a soft write pad portion of the screen, which is preferably the entire screen 21 or can be a designated sub-region of the screen. Here, as indicated, the hand entered characters and the standard text characters share a designated soft write pad portion of the screen 21; and when hand entered characters and standard text characters are both present on the designated portion, these two types of characters are displayed with distinguishable colors, shading, thickness, font and/or other distinguishing indicia, in a default display pattern or a user-selected preferred display pattern.

FIG. 2B illustrates the appearance of the display module screen 21 after entry and recognition of the hand entered character "d" and after stylus pressure on the screen has been removed, indicating that no additional character(s) is being entered presently. Optionally, at the completion of a designated time interval ("DTI"), beginning when stylus pressure is removed from the display module screen ("pen-up") and continuing for a selected length of time Δt(max) (e.g., Δt(max)=0.01=2 sec), without reapplication of stylus pressure, the system interprets this situation as indicating that entry of hand entered characters has (temporarily) ended. If a length Δt(max) is not selected, the system uses a default value Δt(max)=0 and immediately terminates ink display of a hand entered character on the soft write pad as soon as stylus pressure is removed. The entire screen 21, including the soft write pad portion and the remaining portion, if any, now displays standard text in a conventional display pattern, and the hand entered letter "d" in FIG. 2A has been correctly recognized, converted and added to produce the word "password," followed by the cursor 23. Optionally, a standard text character corresponding to the hand entered character ("d" in FIG. 2A) can be added at the location of the cursor 23 while the ink corresponding to the hand entered character is still displayed on the soft write pad, as illustrated in FIG. 2C.

Optionally, the distinguishable display pattern for the hand entered characters and/or for the standard text characters can be changed by the user to provide greater visual distinction for this user. Assume, for example, that a given user has difficulty in distinguishing green and blue but can distinguish between red and blue/green. In this situation, standard text in the write pad portion of the screen (with one or more hand entered characters present) can appear in black, blue, green or as grayed out characters, and the hand entered characters can appear in black, red, orange, purple or another distinguishable color.

Figure 3B:
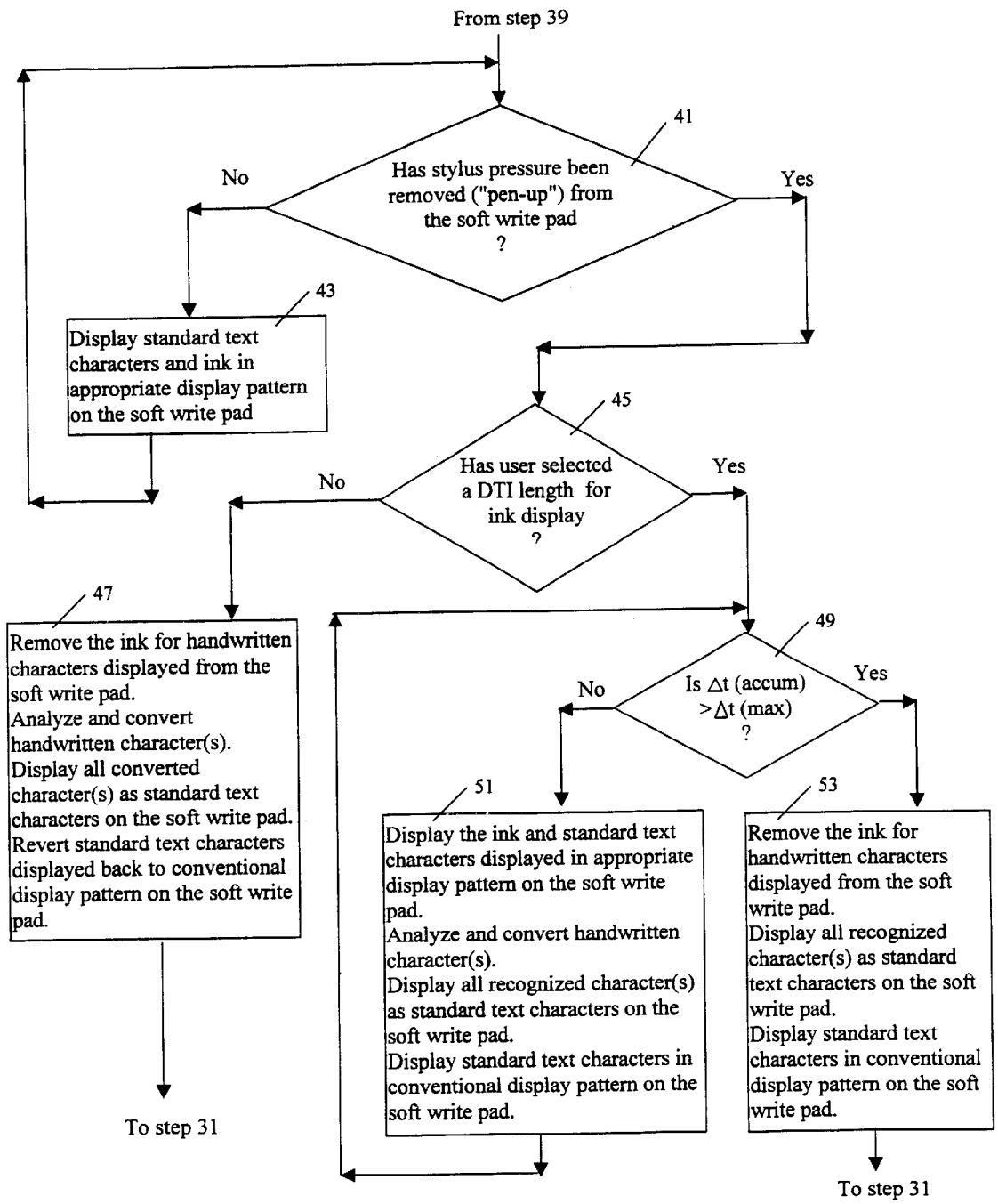

FIGS. 3A and 3B are a flow chart of a procedure for practising the invention, after the system is powered up. In step 31, the system determines if the user has selected a preferred display pattern (color, shading, thickness, font, etc.) for display of standard text characters and/or ink for the hand entered characters on the soft write pad. If the answer to the query in step 31 is "yes," the system implements the preferred display pattern, in step 33, and moves to step 35. If the answer to the query in step 31 is "no," the system implements a default display pattern, in step 34, and moves to step 35. The choice of preferred display pattern or default display pattern will be referred to as the "appropriate display pattern." Steps 31, 33 and 34 may be placed as shown in FIG. 3A or may be placed after step 35.

In step 35, the system determines if stylus pressure has been applied ("pen-down") to the soft write pad to enter one or more hand entered characters. If the answer to the query in step 35 is "no," the system continues to display the standard text characters in the conventional display pattern on the soft write pad, in step 37, and returns to step 35. If the answer to the query in step 35 is "yes," the system displays the standard text characters and ink representing the hand entered characters on the soft write pad in the appropriate display pattern, in step 39, and moves to step 41.

In step 41, the system determines if stylus pressure has been removed ("pen-up") from the soft write pad. If the answer to the query in step 41 is "no," the system continues to display the standard text characters and ink representing the hand entered characters, as entered, in the appropriate display pattern on the soft write pad, in step 43, and returns to step 41. If the answer to the query in step 41 is "yes," the system determines if the user has selected a DTI length Δt(max) for ink display, in step 45. If the answer to the query in step 45 is "no," the system treats this lack of selection as a choice Δt(max)=0 and (1) removes the ink representing the hand entered character(s) from the soft write pad, (2) analyzes, recognizes and converts the hand entered character (s), (3) displays the converted hand entered character(s) as standard text character(s), and (4) returns standard text characters on the soft write pad to the conventional display pattern, in step 47, and returns to step 31.

If the answer to the query in step 45 is "yes," the system determines if Δt(accum), an accumulated time, measured since pen-up occurred, is greater than Δt(max), in step 49. If the answer to the query in step 49 is "no," the system (1) continues to display ink for the hand entered character(s) and the standard text characters in the appropriate display pattern on the soft write pad, (2) analyzes and converts the hand entered character(s), (3) (optionally) displays the converted hand entered character(s) as standard text character (s), and (4) (optionally) returns standard text characters on the soft write pad to the conventional display pattern, in step 51, and returns to step 49.

If the answer to the query in step 49 is "yes," the system (1) removes the ink for the hand entered character(s) from the soft write pad, (2) (optionally) converts and displays the converted hand entered character(s) as standard text character(s), and (3) (optionally) returns standard text characters on the soft write pad to the conventional display pattern, in step 53, and returns to step 3 1.

What is claimed is:

1. A method for display, in a hand held computing device, of standard text characters and one or more hand entered characters entered by a user, the method comprising:

(i) determining if stylus pressure to enter at least one hand entered character has been applied to a designated soft write pad;

(ii) when stylus pressure has not been applied to the soft write pad portion, displaying at least one standard text character in a selected first display pattern on the soft write pad portion and returning to step (i);

(iii) when the stylus pressure has been applied to the soft write pad, determining if the stylus pressure has been removed from the soft write pad portion;

(iv) when the stylus pressure has not been removed from the soft write pad portion, displaying the at least one standard text character in a selected second display pattern, displaying the at least one hand entered character in a selected third display pattern that is visually distinguishable from the second display pattern, and returning to step (iii);

(v) when the stylus pressure has been removed from the soft write pad portion, determining whether a selected time interval, having a selected length, including the present time, and including a time determined with reference to the time the stylus pressure was removed, has elapsed;

(vi) when the stylus pressure has been removed from the soft write pad portion and the selected time interval has not elapsed, continuing to display the at least one standard text character in the second display pattern, continuing to display the at least one hand entered character in the third display pattern, on the soft write pad portion, and returning to step (v); and (vii) when the stylus pressure has been removed from the soft write pad portion and the selected time interval has elapsed, reverting to display of the at least one standard text character in the first display pattern, and returning to step (i).

2. The method of claim 1, further comprising:
  determining if a user of said device has indicated a choice of at least one of said second display pattern for said standard text characters and said third display pattern for said at least one hand entered character; and
  when the user of said device has indicated the choice of at least one of said second display pattern and said third display pattern, implementing the choice in said display pattern of said standard text characters and said at least one hand entered character, respectively, on said soft write pad portion.

3. The method of claim 1, further comprising:
  receiving information on color blindness of a selected user, whereby the user cannot distinguish between a first color and a second color; and
  choosing said second and third display patterns so that at most one of said second and third display patterns includes at least one of the first color and the second color.

4. The method of claim 1, further comprising selecting said second display pattern to include at least one of a selected color, a selected shade of a color, a selected thickness and a selected font for display of at least one of said standard text characters.

5. The method of claim 1, further comprising selecting said third display pattern to include at least one of a selected color, a selected shade of a color, a selected thickness and a selected font for display of at least one of said hand entered characters.

6. The method of claim 1, further comprising removing said display of said at least one hand entered character from said soft write pad portion after said selected time interval has elapsed following entry of said at least one hand entered character on said soft write pad portion.

7. The method of claim 1, further comprising choosing said selected time interval to have a length of at most 2 sec.

8. The method of claim 1, further comprising analyzing and recognizing said at least one hand entered character on said soft pad, converting said at least one hand entered character to a corresponding standard text character, and displaying the converted at least one hand entered character as the corresponding standard text character, displayed in said first display pattern.

9. The method of claim 8, further comprising continuing to display said converted at least one hand entered character in said third display pattern for a second selected time interval after said at least one hand entered character has been converted and displayed as said corresponding standard text character.

10. The method of claim 1, wherein said step of determining if said stylus pressure has been applied to said designated soft write pad comprises determining if said stylus pressure has been applied to said designated soft write pad over at least one standard text character, displayed in said second display pattern on a touch sensitive screen.

11. The method of claim 1, further comprising selecting said second display pattern to be a substantially fully grayed out display pattern.

12. A system for display, in a hand held computing device, of standard text characters and one or more hand entered characters entered by a user, the system comprising:
  a touch sensitive display screen on a hand held computing device that receives and displays at least one hand entered character in a designated soft write pad portion on the display screen and that can recognize the at least one hand entered character as a standard text character; and
  a computer that controls display of the at least one hand entered character and a corresponding standard text character and that is programmed:
    (i) to determine if stylus pressure to enter at least one hand entered character has been applied to a designated soft write pad;
    (ii) when stylus pressure has not been applied to the soft write pad portion, to display the at least one standard text character in a first display pattern on the soft write pad portion and returning to step (i);
    (iii) when the stylus pressure has been applied to the soft write pad, to determine if the stylus pressure has been removed from the soft write pad portion;
    (iv) when the stylus pressure has not been removed from the soft write pad portion, to display the at least one standard text character in a selected second display pattern, to display the at least one hand entered character in a selected third display pattern that is visually distinguishable from the second display pattern, and to return to step (iii);
    (v) when the stylus pressure has been removed from the soft write pad portion, to determine whether a selected time interval, having a selected length, including the present time, and including a time determined with reference to the time the stylus pressure was removed, has elapsed;
    (vi) when the stylus pressure has been removed from the soft write pad portion and the selected time interval has not elapsed, to continue to display the at least one standard text character in the second display pattern, to continue to display the at least one hand entered character in the third display pattern, on the soft write pad portion, and returning to step (v); and
    (vii) when the stylus pressure has been removed from the soft write pad portion and the selected time intervals has elapsed, to revert to display of the at least one standard text character in the first display pattern, and to return to step (i).

13. The system of claim 12, wherein said computer is further programmed:
  to determine if a user of said device has indicated a choice of at least one of said second display pattern for said standard text characters and said third display pattern for said at least one hand entered character; and
  when the user of said device has indicated the choice of at least one of said second display pattern and said third display pattern, to implement the choice in said display pattern of said standard text characters and at least one hand entered character on said soft write pad portion.

14. The system of claim 12, wherein said computer is further programmed:
  to receive information on color blindness of a selected user, whereby the user cannot distinguish between a first color and a second color; and
  to choose said second and third display patterns so that at most one of said second and third display patterns includes at least one of the first color and the second color.

15. The system of claim 12, wherein said second display pattern is selected to include at least one of a selected color, a selected shade of a color, a selected thickness and a selected font for display of at least one of said standard text characters.

16. The system of claim 12, wherein said third display pattern is selected to include at least one of a selected color, a selected shade of a color, a selected thickness and a selected font for display of at least one of said hand entered character.

17. The system of claim 12, wherein said computer is further programmed to remove said display of said at least one hand entered character from said soft write pad portion after said selected time interval has elapsed following entry of said at least one hand entered character on said soft write pad portion.

18. The system of claim 12, wherein said selected time interval is chosen to have a length of at most 2 sec.

19. The system of claim 12, wherein said computer is further programmed: to analyze and recognize said at least one hand entered character on said soft pad, to convert said hand entered character to a corresponding standard text character, and to display the converted hand entered character as the corresponding standard text character, displayed in said first display pattern.

20. The system of claim 19, wherein said computer is further programmed to continue to display said converted at least one hand entered character in said third display pattern for a second selected time interval after said at least one hand entered character has been converted and displayed as said corresponding standard text character.

21. The system of claim 12,wherein said computer is programmed to determine if said stylus pressure has been applied to said designated soft write pad by determining if said stylus pressure has been applied to said designated soft write pad over at least one standard text character, displayed in said second display pattern on a touch sensitive screen.

22. The system of claim 12, wherein said second display pattern is a substantially fully grayed out display pattern.

* * * * *